United States Patent
Baker et al.

(10) Patent No.: US 7,793,504 B2
(45) Date of Patent: Sep. 14, 2010

(54) NOZZLE WITH AN ADJUSTABLE THROAT

(75) Inventors: Von David Baker, Indianapolis, IN (US); Baily Ramachandra Vittal, Carmel, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 947 days.

(21) Appl. No.: 11/417,711

(22) Filed: May 4, 2006

(65) Prior Publication Data

US 2007/0256419 A1 Nov. 8, 2007

(51) Int. Cl.
*F02K 1/00* (2006.01)
(52) U.S. Cl. .......................................... 60/770; 60/771
(58) Field of Classification Search ................... 60/770, 60/771, 782, 242; 239/265.13, 265.39, 265.33
See application file for complete search history.

(56) References Cited

U.S. PATENT DOCUMENTS

| | | | | |
|---|---|---|---|---|
| 3,659,788 | A | * | 5/1972 | Oldfield et al. .......... 239/127.1 |
| 4,000,611 | A | * | 1/1977 | McCardle et al. ............. 60/230 |
| 4,420,932 | A | * | 12/1983 | Mendez et al. ................ 60/230 |
| 4,587,806 | A | | 5/1986 | Madden |
| 5,103,639 | A | | 4/1992 | Wolf |
| 5,110,050 | A | | 5/1992 | Nightingale |
| 5,111,992 | A | | 5/1992 | Barcza |
| 5,141,154 | A | | 8/1992 | Barcza |
| 5,520,336 | A | | 5/1996 | Jourdain et al. |
| 5,706,650 | A | | 1/1998 | Thayer |
| 5,769,317 | A | | 6/1998 | Sokhey et al. |
| 5,970,705 | A | | 10/1999 | Scrace |
| 5,996,936 | A | | 12/1999 | Mueller |
| 6,318,668 | B1 | | 11/2001 | Ulanoski et al. |
| 6,336,319 | B1 | | 1/2002 | Koshoffer |
| 6,382,559 | B1 | | 5/2002 | Sutterfield et al. |
| 6,398,129 | B1 | | 6/2002 | Johnson |
| 6,622,472 | B2 | * | 9/2003 | Plumpe, Jr. .................. 60/204 |
| 6,857,600 | B1 | | 2/2005 | Walker et al. |
| 2002/0036241 | A1 | | 3/2002 | Johnson |
| 2004/0003585 | A1 | | 1/2004 | Allore et al. |
| 2004/0088967 | A1 | | 5/2004 | Webster et al. |

* cited by examiner

*Primary Examiner*—Michael Cuff
*Assistant Examiner*—Andrew Nguyen
(74) *Attorney, Agent, or Firm*—Krieg DeVault LLP; Matthew D. Fair, Esq.

(57) ABSTRACT

One embodiment of the present invention includes a nozzle defining a passage to receive and discharge working fluid to produce thrust. The nozzle includes the first wall structure opposite a second wall structure. The first wall structure includes a first convergent flap pivotally connected to a first divergent flap. The second wall structure includes a second convergent flap pivotally connected to a second divergent flap. The first wall structure and the second wall structure define the throat along the passage and are reconfigurable to adjust dimensional area of the throat. One or more control valves modulate flow of the pressurized fluid into the passage through a first opening in the first wall structure and a second opening in the second wall structure approximate to the throat to change effective area of the throat by fluidic control.

16 Claims, 5 Drawing Sheets

NOZZLE WITH AN ADJUSTABLE THROAT

BACKGROUND

The present invention relates to nozzles, and more particularly, but not exclusively relates to a nozzle with an adjustable throat.

Aircraft thrust propulsion systems typically employ a nozzle. For some aircraft applications, it is desirable to provide a variable nozzle throat. Typically, existing variable throat nozzles have relatively limited adjustability, are exceedingly complex, and/or impose a significant weight penalty. Thus, there remains a demand for further contributions in this area of technology.

SUMMARY

One embodiment of the present invention includes a unique technique to adjust a nozzle. Other embodiments include unique apparatus, devices, systems, and methods to adjust a nozzle. Further embodiments, forms, objects, features, advantages, aspects, and benefits of the present application shall become apparent from the detailed description and drawings included herein.

DETAILED DESCRIPTION OF SELECTED EMBODIMENTS

Figure 1:
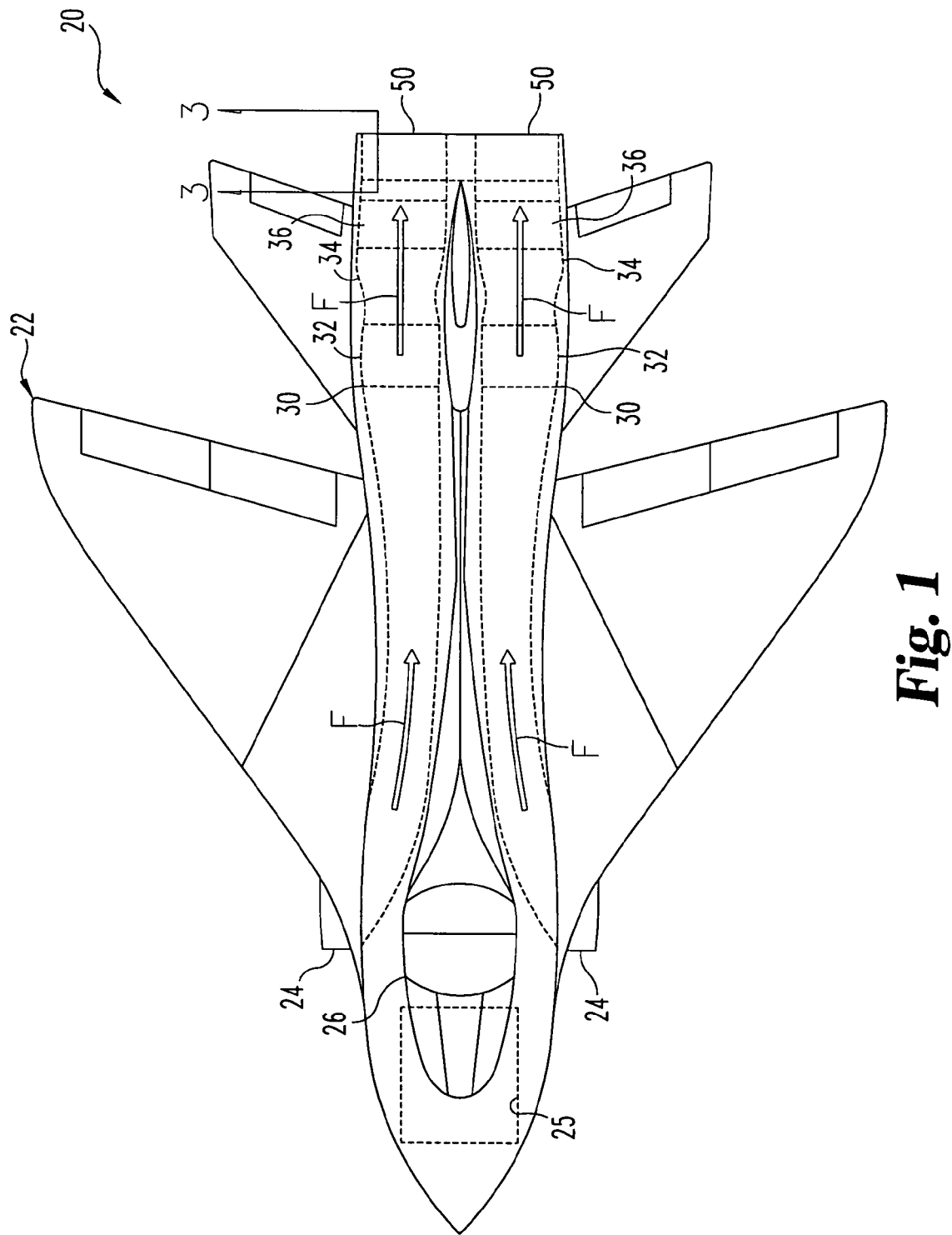
FIG. 1 is a partial, diagrammatic view of a vehicle with a gas turbine engine thrust propulsion system.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein are contemplated as would normally occur to one skilled in the art to which the invention relates.

One embodiment of the present application includes a nozzle with a variable throat that is adjusted by both reconfiguring a passageway wall structure to change throat dimension and by fluidic injection into the nozzle passageway to change effective throat area. In one form, this throat is of a convergent-divergent type. Alternatively or additionally, in another form pneumatic actuation to change structural dimensioning of the nozzle and fluidic injection to change effective throat area both use pressurized fluid from a gas turbine engine compressor.

FIG. 1 illustrates a vehicle 20 of another embodiment of the present invention. Vehicle 20 is in the form of an aircraft 22 with thrust propulsion provided by two gas turbine engines 30. Aircraft 22 defines two intakes 24 to provide air to each engine 30 in the direction indicated by corresponding arrows F. Working fluid flows through each engine 30 in a like direction, and is eventually discharged after combustion to produce thrust. Each engine 30 includes at least one multistage compressor 32, a combustor section 34, and at least one turbine 36. Working fluid exists each engine 30 through a corresponding nozzle 50. Nozzle 50 is of a two-dimensional (2D), variable throat, Convergent-Divergent (C-D) type as more fully described hereinafter in connection with FIGS. 3-5. Optionally, each engine 30 can include an augmenter (not shown) downstream of turbine 36 that would typically be upstream of the respective nozzle 50.

Figure 2:
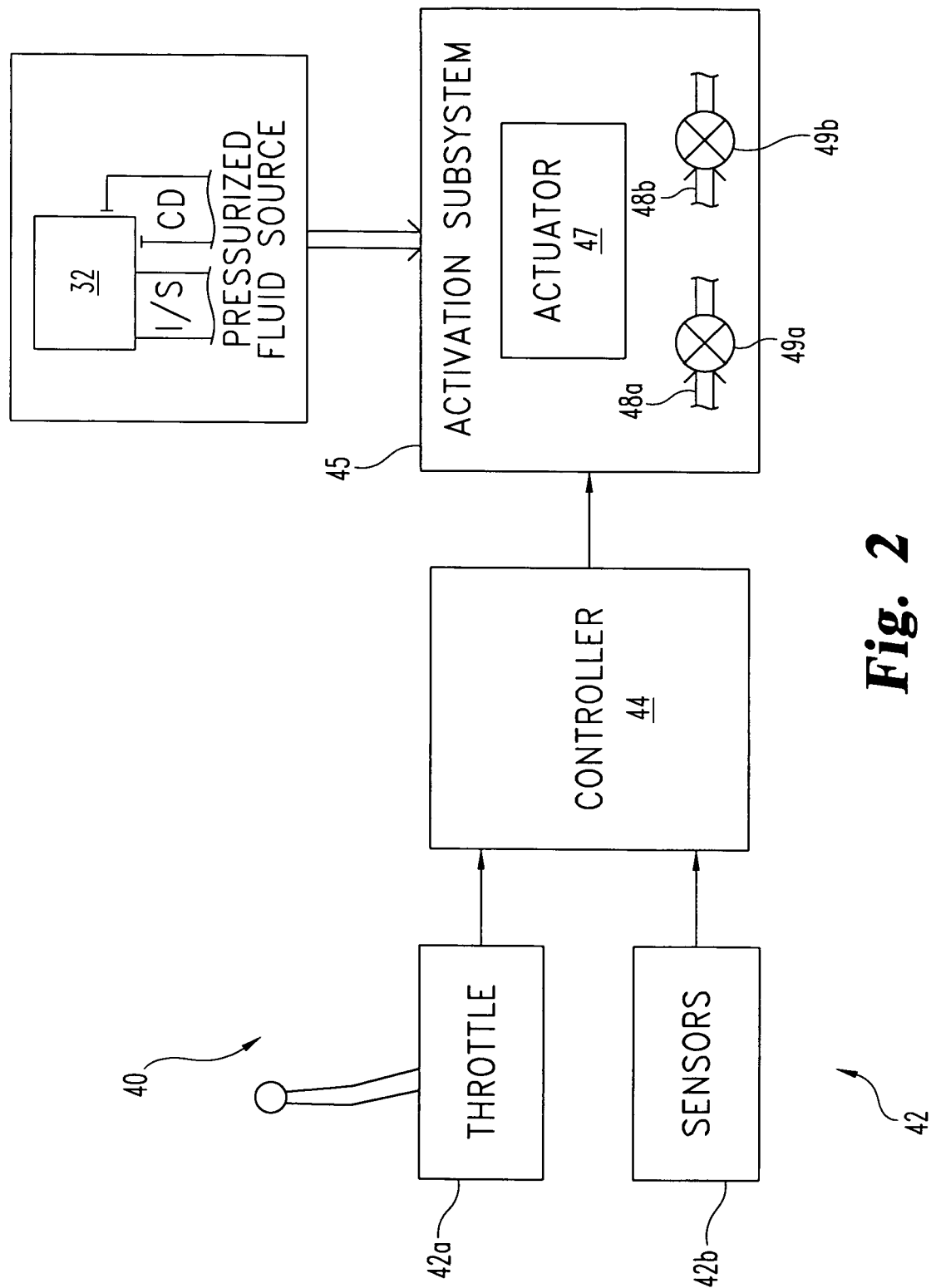
FIG. 2 is a diagrammatic view of a control system for an adjustable nozzle included in the propulsion system of FIG. 1.

Aircraft 22 includes wings to provide lift during propulsion by engines 30 and standard control surfaces. Aircraft 22 includes an avionics bay 25 shown in phantom that is proximate to pilot cockpit 26. Referring additionally to FIG. 2, control system 40 is illustrated. Control system 40 includes input devices 42 in the form of an operator control device, such as throttle 42a (typically located in cockpit 26) and aircraft sensors 42b (typically positioned at various locations relative to aircraft 22 depending on the parameter being detected). Input devices 42 provide corresponding input signals to controller 44 in a compatible signal format. Controller 44 monitors aircraft performance and provides corresponding output signals to various devices including nozzle actuation subsystem 45.

Subsystem 45 receives pressurized fluid from pressurized fluid source 46. In the illustrated embodiment, the pressurized fluid is provided in the form of compressed air from compressor 32. This compressed air is provided from an interstage (I/S) region of compressor 32 as symbolically indicated by the schematic conduit labeled I/S, and/or from a compressor discharge (CD) region of compressor 32 as indicated by the schematic conduit labeled CD. Subsystem 45 includes pneumatic actuator 47 and pneumatic flow control valves 49a and 49b that are responsive to control signals from controller 44. Values 49a and 49b are structured to direct the flow of fluid supplied by conduits 48a and 48b, respectively. Further aspects of actuation subsystem 45 are described hereinafter in connection with FIGS. 3-5.

Controller 44 is typically positioned in avionics bay 25 and may be a single component, or a collection of operatively coupled components. Controller 44 may be comprised of digital circuitry, analog circuitry, or a hybrid combination of both of these types. Also, controller 44 may be programmable, an integrated state machine, or a hybrid combination thereof. Controller 44 may include one or more Arithmetic Logic Units (ALUs), Central Processing Units (CPUs), memories, limiters, conditioners, filters, format converters, or the like which are not shown to preserve clarity. In one form, controller 44 is of a programmable variety that executes algorithms and processes data in accordance with operating logic that is defined by programming instructions (such as software or firmware). Alternatively or additionally, operating logic for controller 44 can be at least partially defined by hardwired logic or other hardware. In one particular form, the controller 44 is configured to operate as a Full Authority Digital Engine Control (FADEC); however, in other embodiments it may be organized/configured in a different manner as would occur to those skilled in the art. It should be appreciated that controller 44 may be exclusively dedicated to nozzle control/activation, or may further be used in the regulation/control/activation of one or more other subsystems or aspects of aircraft 22.

Figure 3:
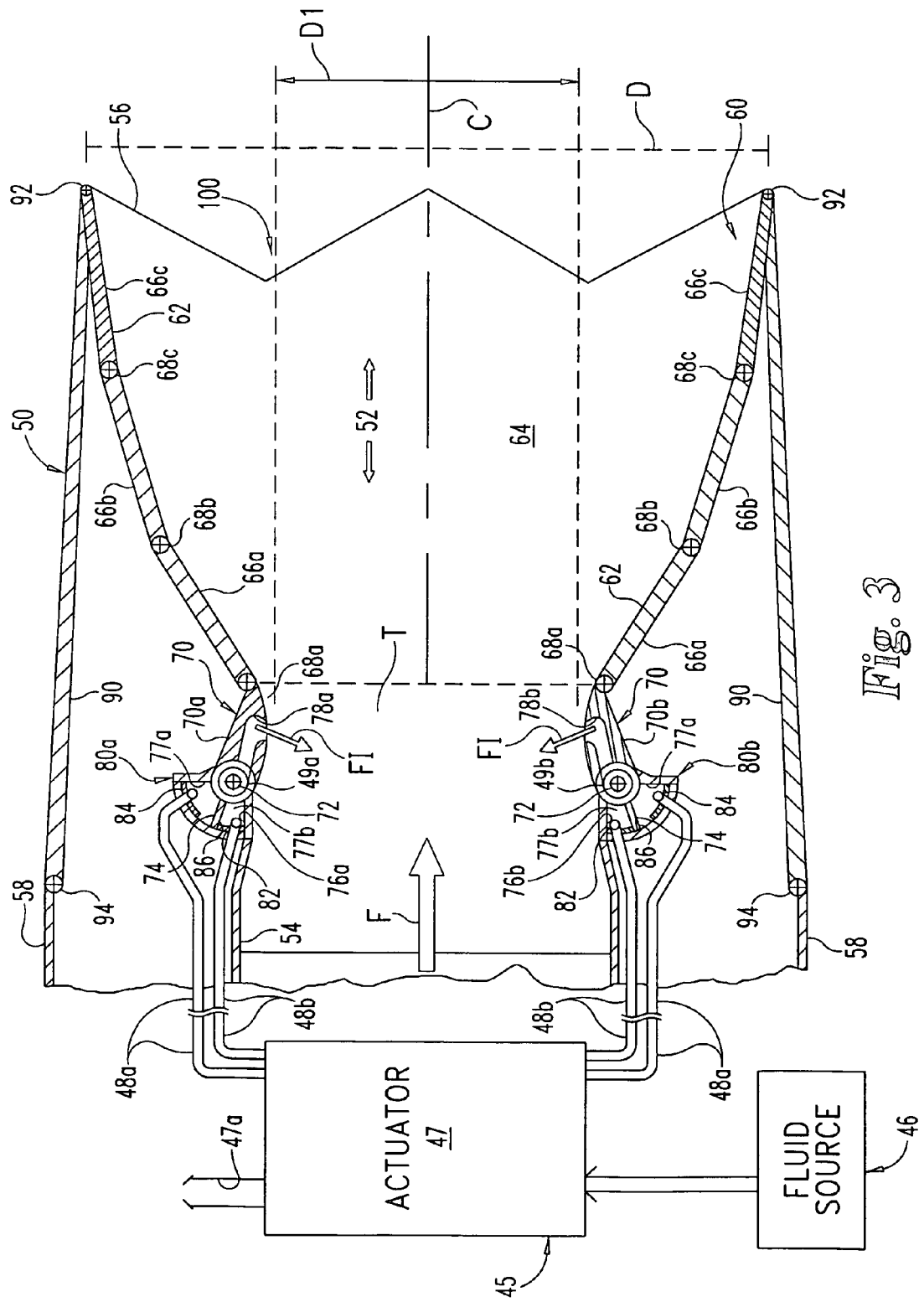
FIG. 3 is a partial sectional, diagrammatic view of the adjustable nozzle of FIG. 1 in a first configuration that corresponds to the section line 3-3 shown in FIG. 1.
Figure 4:
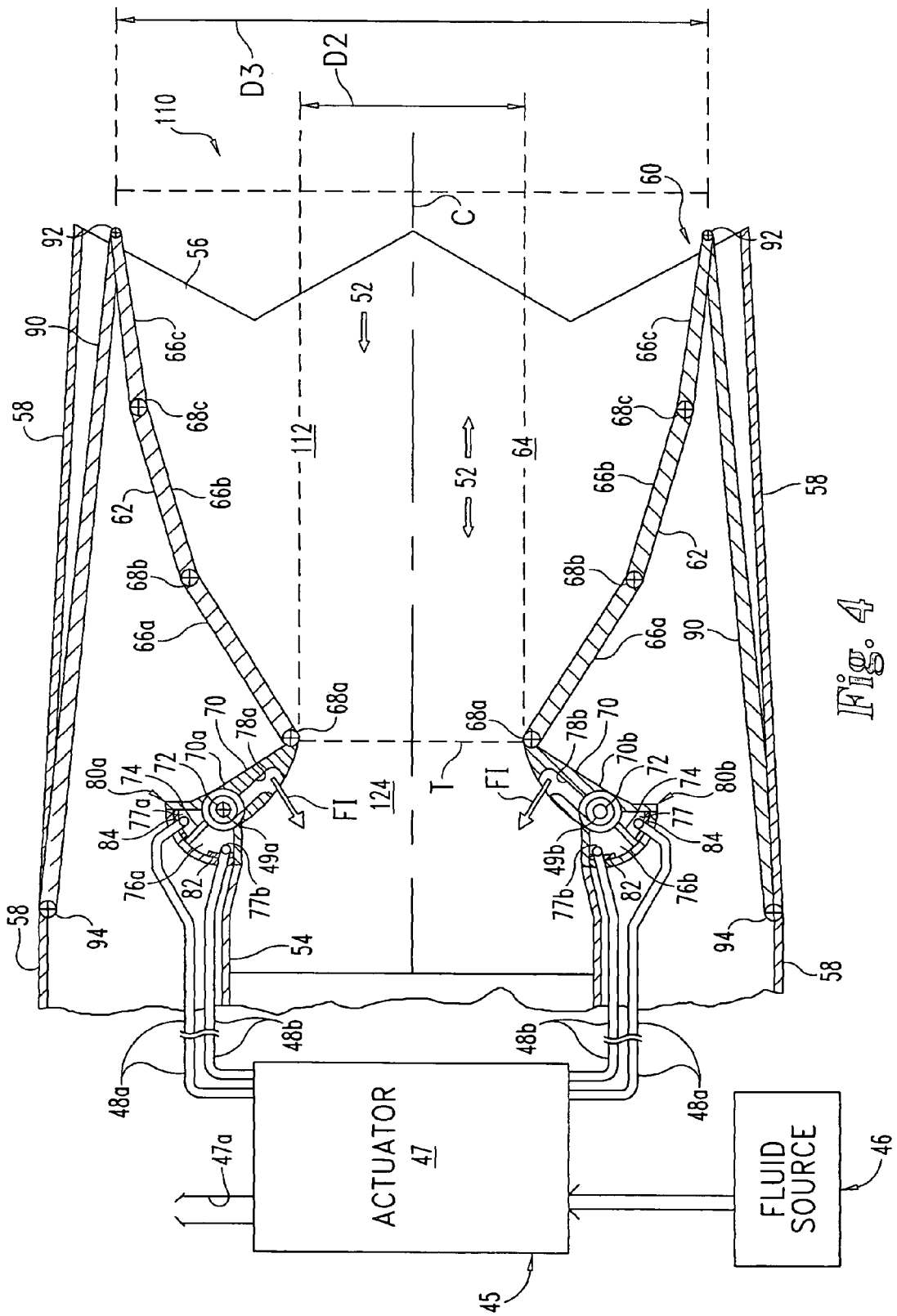
FIG. 4 is a partial sectional, diagrammatic view of the adjustable nozzle of FIG. 1 in a second configuration.
Figure 5:
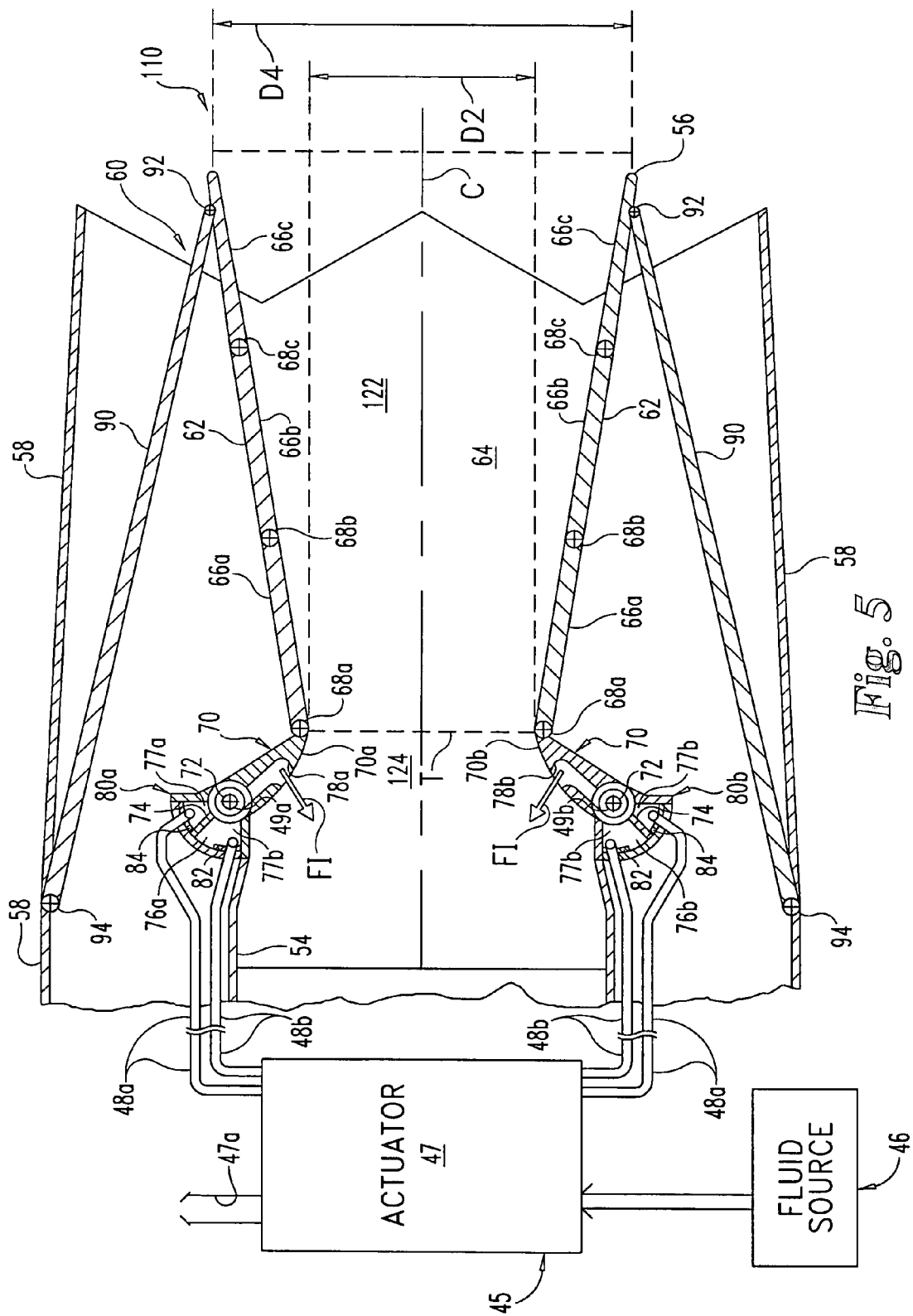
FIG. 5 is a partial sectional, diagrammatic view of the nozzle of FIG. 1 in a third configuration.

Referring also to FIGS. 3-5, further details concerning nozzle 50 are described; where like reference numerals refer to like features. FIG. 3 corresponds to the section line 3-3 shown in FIG. 1. Like FIG. 3, FIGS. 4 and 5 also correspond to partial sectional views of nozzle 50 in different configurations as are more fully described hereinafter. Nozzle 50 extends along central flow axis C. Nozzle 50 defines passage 52. Working fluid received from the corresponding engine 30 enters passage 52 through inlet 54 and is discharged through outlet 56, moving in the direction indicated by arrow F. Outlet 56 has a dimension D corresponding to the nozzle exit area. Outlet 56 is bounded by an edge defining chevrons of a standard type; however, it should be understood that in other embodiments chevrons may differ or be absent. Optionally, nozzle 50 may include one or more further structures directed to thrust vectoring, signature suppression, and/or noise suppression.

The nozzle 50 is enclosed in a nacelle that includes an outer nacelle wall 58. Internally, nozzle 50 defines passage 52 with passage wall structure 60. Passage wall structure 60 has an approximately rectilinear cross section taken along axis C perpendicular to the view plane of FIGS. 3-5. This geometric arrangement of passage 52 corresponds to a 2D nozzle configuration. Passage wall structure 60 includes two opposing articulating wall structures 62 (each shown in section) and two opposing sidewalls 64. Sidewalls 64 are generally symmetric about the view plane of FIGS. 3-5. Wall structures 62 are each positioned between the two sidewalls 64. Wall structures 62 are approximately mirror images of one another (symmetric) about a plane containing axis C that is perpendicular to the view plane of FIGS. 3-5. To better illustrate wall structures 62 in FIGS. 3-5, only one sidewall 64 is depicted.

Wall structures 62 cooperate to define a Convergent-Divergent (C-D) throat T along passage 52. Wall structures 62 include three divergent flaps 66a, 66b, and 66c (collectively referenced divergent flaps 66) that are pivotally connected to one or more couplings 68a, 68b, and 68c (collectively designate pivot couplings 68). Pivot couplings 68 each include respective crosshairs that represent a corresponding, interconnecting pivot axis, which is perpendicular to the view plane of FIGS. 3-5. Pivot couplings 68 are not fixed relative to nacelle wall 58 and sidewalls 64, being subject to displacement as attached members move as part of a kinematic chain. Pivot couplings 68 can each be of a hinge type or otherwise configured as would occur to those skilled in the art.

Wall structures 62 also each include a convergent flap 70 that is pivotally connected to a corresponding divergent flap 66a by coupling 68a. Flaps 70 are also more specifically designated upper flap 70a and lower flap 70b. Convergent flap 70 is also connected by pivot coupling 72. Pivot coupling 72 permits rotation of convergent flap 70 relative to sidewalls 64 and nacelle wall 58. Rotation of convergent flap 70 takes place about a rotational axis perpendicular to the view plane as indicated by the corresponding crosshairs. In contrast to couplings 68, couplings 72 are fixed relative to other nozzle structure, such as inlet 54, wall 58, and sidewalls 64. In response to the rotation of convergent flap 70, the pivotally linked divergent flaps 66 of the same wall structure 60 also move. Each convergent flap 70 is fixed to a balance member 74 (also configured as a flap) that is positioned opposite convergent flap 70 relative to pivot coupling 72. Convergent flaps 70 are also individually designated flap 70a and flap 70b.

Nozzle 50 also includes two control flaps 90 that are each coupled to a different one of divergent flaps 66c by a corresponding coupling 92. Coupling 92 provides for pivotal and sliding movement. Control flaps 90 are also pivotally coupled to rotate relative to wall 58 by couplings 94. The position of couplings 94 is fixed relative to wall 58 and sidewalls 64 like couplings 72. The axis of rotation for each coupling 92 and 94 is perpendicular to the view plane of FIGS. 3-5 and is indicated by crosshairs. Actuation subsystem 45 includes one or more rotary actuators (not shown) to selectively turn flaps 90 about these axes at couplings 94. The sliding movement takes place along the respective divergent flaps 66c, having a translational components along axis C and along an axis perpendicular and coplanar to axis C.

Two actuation devices 80a and 80b are shown in each of FIGS. 3-5. Actuation devices 80a and 80b each function as part of actuation subsystem 45, but are separately shown to enhance operational understanding. Balance members 74 each extend into a corresponding plenum 76a and 76b defined by actuation device 80a and 80b, respectively. Accordingly, each balance member 74 divides the respective plenum 76a or 76b into two chambers 77a and 77b. Each actuation device 80a and 80b includes stop 82 and stop 84 within chamber 77b and 77a, respectively. An end portion 86 of each balance member 74 is positioned between stops 82 and 84. As depicted in FIG. 3, balance members 74 each engage stop 82; and as depicted in FIGS. 4 and 5, balance members 74 each engage stop 84. Conduits 48a and 48b are in fluid communication with chambers 77a and 77b of plenum 76a, respectively, and conduits 48a and 48b are in fluid communication with chamber 77a and 77b of plenum 76b, respectively. Conduits 48a and 48b are also in fluid communication with actuator 47 of subsystem 45. As depicted in FIGS. 3-5, actuator 47 includes a vent 47a. The corresponding balance member 74 is positioned between the openings of conduit 48a and 48b in each plenum 76a and 76b. Where structures 62 and devices 80a and 80b meet sidewalls 64, appropriate sealing techniques are utilized to provide acceptable containment of pressurized fluid in passage 52 and plenums 76a and 76b.

Flaps 70a and 70b each defined a fluidic control passageway 78a and 78b, respectively. Passageways 78a and 78b each open into passage 52 through the respective flap 70a and 70b. Each passageway 78a and 78b is also in fluid communication with flow control valve 49a and 49b, respectively, of subsystem 45. Valves 49a and 49b are arranged to control the flow of pressurized fluid from source 46 into passageways 78a and 78b, and correspondingly into passage 52. This fluid is supplied by source 46 and is routed through a separate conduit 48c that is schematically shown in FIG. 2, but is omitted in FIGS. 3-5 to enhance clarity. Alternatively, fluid could be supplied to valves 49a and/or 49b through the respective plenums 76a or 76b and/or conduits 48a and 48b.

In one form, valves 49a and 49b are of a rotary type that includes two concentric circular disks in series within a housing. One of these disks is fixed and the other selectively rotates, with both defining openings of different sizes that are selectively aligned by relative rotation to form a variable area orifice for modulation of fluid flow. Nonetheless, in other embodiments, a different arrangement of valve 49a and/or 49b can be utilized. Where structures 62 and devices 80a and 80b meet sidewalls 64, appropriate sealing techniques are utilized permit the containment of pressurized fluid in passage 52 and plenums 76a and 76b.

Referring generally to FIGS. 1-5, the throat adjustment operation of nozzle 50 is next described. FIG. 3 illustrates nozzle throat configuration 100 that defines throat T with a maximum lineal throat dimension separating structures 62, which is designated dimension D1. Dimension D1 corresponds to a minimum geometric (dimensional) throat area for throat T. In contrast, nozzle throat configuration 110 of FIG. 4 and nozzle throat configuration 120 of FIG. 5 each define throat T with a minimum lineal throat dimension separating structures 62, which is designated dimension D2. Dimension D2 corresponds to a maximum geometric (dimensional) throat area for throat T. To adjust nozzle 50 from configuration 100 of FIG. 3 to configuration 110 of FIG. 4, actuator 47 is directed by controller 44 to route pressurized fluid from source 46 into conduits 48b and to vent fluid from conduits 48a through vent 47a. Correspondingly, the pressurized fluid enters chamber 77b from conduit 48b and is vented from chamber 77a through conduit 48a for each device 80a and 80b. Pressure drops in chamber 77a due to venting, and pressure increases in chamber 77b due to the introduction of pressurized fluid from source 46. As the pressurized fluid bears against balance member 74, balance member 74 disengages stop 82 and moves towards stop 84, rotating upper flap 70a clockwise and lower flap 70b counterclockwise about the corresponding rotational axes of couplings 72. As pressurized fluid in chamber 77b continues to impinge on balance member 74 with sufficient force, balance member 74 engages stop 84 as shown in FIG. 4. With this movement of balance member 74, upper flap 70a pivots clockwise and lower flap 70b pivots counterclockwise, and pull divergent flaps 66a inward with a corresponding pivoting action at couplings 68a. In response, divergent flaps 66b and 66c are reconfigured as shown in FIG. 4. This reconfiguration also includes a rotational adjustment of flaps 90 with a corresponding rotational change at couplings 92 and 94 as shown in FIG. 4. To return to configuration 100 of FIG. 3 from configuration 110 of FIG. 4, actuator 47 is directed to vent air from chambers 77a through conduits 48a and to supply pressurized fluid of sufficient level from source 46 to chambers 77b through conduits 48b until each balance member 74 rotates, which pivots upper flap 70a counterclockwise and lower flap 70b clockwise until each respective balance member 74 returns to the corresponding stop 82.

Both configurations 110 and 120 have the same dimensions for throat T, and convergent flaps 70 maintain the same relative position; however, the exit area and corresponding discharge throat are sized differently. To adjust nozzle 50 from configuration 110 to configuration 120, the flaps 90 are rotated at couplings 94 toward each other and a sliding/pivoting travel action at couplings 92 pushes divergent flaps 66c towards each other to facilitate changing the exit throat size from that corresponding to dimension D3 in FIG. 4 to that corresponding to dimension D4 in FIG. 5. Furthermore, it should be noted that dimensions D3 and D4 are also smaller than dimension D shown in FIG. 3. This reconfiguration including pivoting of divergent flaps 66 to become approximately aligned along a straight-line path, as depicted in FIG. 5. As a result, the length along axis C of divergent section 112 shown in FIG. 4 increases to that depicted as divergent section 122 in FIG. 5. For these different divergent sections 112 and 122, a convergent section 124 of the nozzle 50 remains approximately the same because the relative position of convergent flaps 70 does not differ in configurations 110 and 120. To return to configuration 110 from configuration 120, the rotational movement of flaps 90 is reversed to pivot flaps 90 and correspondingly pull flaps 66c away from each other and restore dimension D3 to outlet 54.

The adjustment of nozzle 50 between configurations 100, 110, and 120 provides a variably dimensioned C-D throat T corresponding to different geometries of structure 60, as well as different exit areas for the discharge throat. The pressurized fluid from source 46 is provided at a higher pressure level than the working fluid pressure level in nozzle 50. Balance members 74 are sized so that the pressure in plenums 76a and 76b is sufficient to overcome the opposite moment reaction against flaps 70 caused by working fluid flowing through passage 52 as indicated by arrows F.

Besides the different geometric configurations of nozzle 50, the effective throat size can be varied by controllably injecting pressurized fluid into passage 52 through passageways 78a and 78b of convergent flaps 70. This fluidic injection stream from structures 62 is symbolically represented by arrows FI in FIGS. 3-5. The flow of fluidic streams is regulated with valves 49a and 49b of actuation subsystem 45 in response to signaling from controller 44. The fluidic flow rate can be modulated between different nonzero levels and/or pulsed between on and off operating states at varying frequency to provide a range of effective throat size variation relative to a given geometric configuration, such as configuration 100, 110, or 120, to name a few representative examples.

The use of fluidic injection for nozzle effective throat area control in conjunction with geometric reconfigurability has been experimentally demonstrated by simulation. The integral combination of fluidic injection and a moving flap that is pneumatically actuated are among the embodiments of the present application, and this arrangement has been found to produce a wider range of variation of throat area than can be achieved efficiently by fluidic injection or geometric reconfigurability alone. In one example, pneumatic actuation of nozzle throat area provides a range from 120% to 200% of the fully choked minimum effective throat area. In this example, at each convergent flap 70 geometric area extreme, (for example, the maximum extreme of configuration 100 and the minimum extreme of configuration 110 or 120), the effective area can be varied by about 35% by fluidic injection without excessive use of pressurized air from compressor 32. Accordingly, for this example, the overall C-D throat T variation is from about 95% to about 130% of the fully choked minimum effective throat area at one geometric extreme, and from about 165% to about 200% of the fully choked minimum effective throat area at the other geometric extreme. Indeed, for certain applications, there is no requirement for adjustability between 130% and 165% of the fully choked minimum effective throat area. In alternative embodiments, the nozzle design range can be altered to cover desired ranges using standard techniques, and may be provided in such manner to extend over the entire range from 95% to 200% as a variation of the given example.

Many other embodiments of the present invention are envisioned. For example, in one embodiment, the convergent flap configurations are mechanically locked in place rather than relying on pneumatic pressure alone. In still other examples, the pneumatic rotation of convergent flap 70 includes one or more intermediate positions in addition to the two stops to geometrically reconfigure throat T, and/or provides for a continuous range of geometric adjustability. In yet other examples, only geometric reconfiguration or fluidic injection are utilized to change effective throat size. In a different example, pneumatic actuation of different nozzle configurations using pressurized fluid from one or more compressors and/or compressor stages is used in other arrangements, with or without fluidic throat adjustment capability. In a further alternative, adjustment of exit throat area as illustrated by comparing configurations 100 and 200 is absent.

In another example, working fluid is provided from a different type of engine, engine 30 includes two or more compressors and/or turbines, nozzle 50 is geometrically configured in other than a 2-D arrangement, and/or nozzle 50 is arranged with a variable throat other than a C-D type. For instance, this arrangement could be used to provide a variable convergent nozzle that does not involve a divergent portion. Among the applications of a variable convergent nozzle would be afterburning and/or variable cycle subsonic engines. In one form, the nozzle is axisymmetric about a central axis thereof instead of the 2-D type. In a further example, one or more throat adjustment techniques of the present invention are used to vary exit area through the discharge outlet of the nozzle. In one form, actuator 47 is an electromechanical, solenoid controlled device with valves and passageways configured to route pressurized fluid relative to conduits 48a, 48b, and vent 47a as described; however, in other embodiments different arrangements of actuator 47 can be utilized. In another example, pressurized fluid is provided additionally or alternatively from a source different than compressor 32.

In a further embodiment, an aircraft propulsion system includes means for providing working fluid to a nozzle from an engine, wherein the nozzle includes means for reconfiguring a wall structure that defines a passage with a throat through which the working fluid is discharged to produce thrust, and means for adjusting flow of pressurized fluid into the passage through one or more openings in the wall structure to provide a desired change in effective size of the throat while the wall structure is in the second configuration and the working fluid is received through the passage.

Still another embodiment comprises: providing working fluid to a nozzle from an engine, where the nozzle includes a reconfigurable wall structure defining a passage with the throat through which the working fluid is discharged to produce thrust; reconfiguring the wall structure from a first configuration to a second configuration to adjust dimensional area of the throat; adjusting flow of pressurized fluid into the passage through one or more openings in the wall structure to provide a desired change in effective area of the throat as the working fluid is received through the passage.

Another embodiment is directed to a gas turbine engine including at least one compressor and at least one turbine, a nozzle defining a passage operable to receive working fluid from the turbine for discharge to produce thrust, and a first conduit operable to selectively direct pressurized fluid from the compressor into a first actuation plenum. The nozzle includes a first convergent flap and a first divergent flap operable to define an adjustable convergent-divergent throat along the passage. The first convergent flap is typically mounted to rotate in response to a controlled change in the pressurized fluid in the actuation plenum to adjust the convergent-divergent throat area.

In a different embodiment, a gas turbine includes at least one compressor and at least one turbine, and a nozzle defines a working fluid passage operable to receive working fluid from the turbine for discharge to produce thrust. The nozzle includes an articulating wall structure operable to define an adjustable convergent-divergent throat along the passage. A first conduit selectively directs pressurized fluid from the compressor into the working fluid passage through the wall structure. This embodiment also includes a controller operable to selectively determine an adjustment for the convergent-divergent throat that is defined by one or more structural adjustment signals to geometrically reconfigure the wall structure and one or more fluidic adjustment signals. An actuation subsystem responsive to the one or more structural adjustment signals geometrically reconfigures the wall structure from a first configuration with a first distance across the passage at the throat to a second configuration with a second distance across the passage at the throat that is different than the first distance. The actuation subsystem is also responsive to the one or more fluidic adjustment signals to change effective area of the throat by directing a selected flow of the pressurized fluid into the working fluid passage from the first conduit.

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary. While the invention has been illustrated and described in detail in the drawings and foregoing description, the same is to be considered as illustrative and not restrictive in character, it being understood that only the selected embodiments have been shown and described and that all changes, modifications and equivalents that come within the spirit of the invention as defined herein or by any of the following claims are desired to be protected.

What is claimed is:

1. An apparatus, comprising:
   a gas turbine engine including at least one compressor and at least one turbine;
   a nozzle defining a passage operable to receive working fluid from the turbine for discharge to produce thrust, the nozzle including a first convergent flap pivotally connected to a first divergent flap and operable to define an adjustable throat for a convergent-divergent configuration of the nozzle along the passage; and
   a first conduit operable to selectively direct pressurized fluid from the compressor into a first actuation plenum, the first convergent flap being pivotally mounted to rotate in response to a controlled change in the pressurized fluid in the actuation plenum to adjust size of the throat, the first convergent flap fixed relative to a balance member such that both rotate about a common pivot axis; and
   wherein the balance member extends into the first actuation plenum to divide the first actuation plenum into a first chamber and a second chamber, the first conduit opens into the first chamber, and the pressurized fluid is selectively directed into the first chamber to apply force to the balance member to rotate the first convergent flap in a first direction.

2. The apparatus of claim 1, further comprising means for actuating a throat adjustment of the nozzle in response to one or more performance characteristics.

3. The apparatus of claim 1, further comprising an aircraft carrying the gas turbine engine, the nozzle and the conduit, aircraft being structure to be propelled by thrust generated by discharging the working fluid from the nozzle.

4. The apparatus of claim 1, further comprising a second conduit opening into the second chamber and the pressurized fluid is selectively directed into the second chamber to apply another force to the balance member to rotate the first convergent flap in a second direction, the second direction being opposite the first direction.

5. The apparatus of claim 4, further comprising a first stop in the first chamber and a second stop in the second chamber, the balance member being positioned between the first stop and the second stop, the balance member being structured to engage the first stop if the pressurized fluid is provided through the first conduit and the second stop if the pressurized fluid is provided through the second conduit.

6. The apparatus of claim 1, wherein the nozzle includes a second convergent flap opposite the first convergent flap and a second divergent flap opposite the first divergent flap, a second conduit operable to selectively direct the pressurized fluid from the compressor into a second actuation plenum, and the second convergent flap is pivotally mounted to rotate in response to a designated change in the pressurized fluid in the second actuation plenum to adjust the throat size of the convergent-divergent configuration.

7. The apparatus of claim 1, further comprising means for adjusting the effective size of the throat with fluidic control.

8. The apparatus of claim 1, wherein the nozzle is axisymmetric about a central axis.

9. An apparatus, comprising:
a gas turbine engine including at least one compressor and at least one turbine;
a nozzle defining a passage operable to receive working fluid from the turbine for discharge to produce thrust, the nozzle including a first convergent flap pivotally connected to a first divergent flap and operable to define an adjustable throat for a convergent-divergent configuration of the nozzle along the passage;
a first conduit operable to selectively direct pressurized fluid from the compressor into a first actuation plenum, the first convergent flap being pivotally mounted to rotate in response to a controlled change in the pressurized fluid in the actuation plenum to adjust size of the throat; and
a balance member forming a rotating wall of the first actuation plenum and structured to change the volume of the first actuation plenum when the pressurized fluid in the actuation plenum adjusts the size of the throat; and
wherein the first convergent flap is fixed to the balance member, the balance member extends into the first actuation plenum to divide the first actuation plenum into a first chamber and a second chamber, the first conduit opens into the first chamber, and the pressurized fluid is selectively directed into the first chamber to apply force to the balance member to rotate the first convergent flap in a first direction.

10. The apparatus of claim 9, further comprising means for actuating a throat adjustment of the nozzle in response to one or more performance characteristics.

11. The apparatus of claim 9, further comprising an aircraft carrying the gas turbine engine, the nozzle and the conduit, aircraft being structure to be propelled by thrust generated by discharging the working fluid from the nozzle.

12. The apparatus of claim 9, further comprising a second conduit opening into the second chamber and the pressurized fluid is selectively directed into the second chamber to apply another force to the balance member to rotate the first convergent flap in a second direction, the second direction being opposite the first direction.

13. The apparatus of claim 12, further comprising a first stop in the first chamber and a second stop in the second chamber, the balance member being positioned between the first stop and the second stop, the balance member being structured to engage the first stop if the pressurized fluid is provided through the first conduit and the second stop if the pressurized fluid is provided through the second conduit.

14. The apparatus of claim 9, wherein the nozzle includes a second convergent flap opposite the first convergent flap and a second divergent flap opposite the first divergent flap, a second conduit operable to selectively direct the pressurized fluid from the compressor into a second actuation plenum, and the second convergent flap is fixed to a second balance member and is pivotally mounted to rotate in response to a designated change in the pressurized fluid in the second actuation plenum to adjust the throat size of the convergent-divergent configuration.

15. The apparatus of claim 9, further comprising means for adjusting the effective size of the throat with fluidic control.

16. The apparatus of claim 9, wherein the nozzle is axisymmetric about a central axis.

\* \* \* \* \*